Oct. 19, 1965        F. BECHER        3,212,404

GEAR CUTTING MACHINE

Filed Dec. 24, 1963        3 Sheets-Sheet 1

INVENTOR
FRIEDRICH BECHER

BY Cushman, Darby & Cushman
ATTORNEYS

United States Patent Office 3,212,404
Patented Oct. 19, 1965

3,212,404
GEAR CUTTING MACHINE
Friedrich Becher, Ludwigsburg, Germany, assignor to Firma Hermann Pfauter, Ludwigsburg, Germany, a company of Germany
Filed Dec. 24, 1963, Ser. No. 333,090
19 Claims. (Cl. 90—4)

This invention relates generally to gear forming and more particularly to a novel and improved gear generating apparatus.

While hobbing is the most economical process of gear cutting, it cannot be employed to form all the gear-tooth systems or elements on a wheel body having a plurality of closely situated gear-tooth systems of different diameters. The smaller diameter gear-tooth systems on such wheel bodies frequently cannot be hobbed because there is insufficient clearance or space between the smaller and larger diameter gear-tooth systems for entry of the hob during its working movement or traverse. Thus, in order to cut the smaller diameter gear-tooth systems on such multiple gear-tooth system wheel bodies, it is necessary to utilize a gear shaping or gear planing process. Therefore, in the past in order to employ the various gear generating processes necessary to cut such multiple gear-tooth system wheel bodies, it has been necessary to utilize different machines for each of the various required gear generating processes. It is clear that such prior practices result in increased cost and decreased efficiency, since it is necessary to repeatedly transfer the wheel body workpiece from one machine to another with repeated mounting and unmounting operations. Such prior art practices are not only time consuming but the repeated and successive transfer and mounting operations increase the likelihood of mounting inaccuracies and errors thereby increasing the cost of producing a finished multiple gear-tooth system wheel body.

Accordingly, a principal object of the present invention relates to a novel gear generating apparatus wherein a wheel body having a plurality of gear-tooth systems can be economically and readily formed.

An additional object of the present invention relates to a novel gear generating apparatus wherein a wheel body having a plurality of closely spaced gear-tooth systems of different diameter can be produced utilizing different gear generating processes.

A further object of this invention relates to a novel gear cutting apparatus wherein a wheel body having a plurality of closely spaced gear-tooth systems of different diameters can be produced by simultaneously utilizing hobbing and gear shaping processes to generate different gear-tooth systems on the wheel body.

Another object of the present invention relates to a novel gear cutting apparatus wherein a wheel body having a plurality of different diameter gear-tooth systems thereon can be produced by simultaneously utilizing hobbing and gear shaping processes to cut different gear-tooth systems on the wheel body without requiring the successive transfer and mounting of the wheel body on a plurality of different machines.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference now being made to the accompanying drawings which form a part hereof, wherein.

Figure 1:
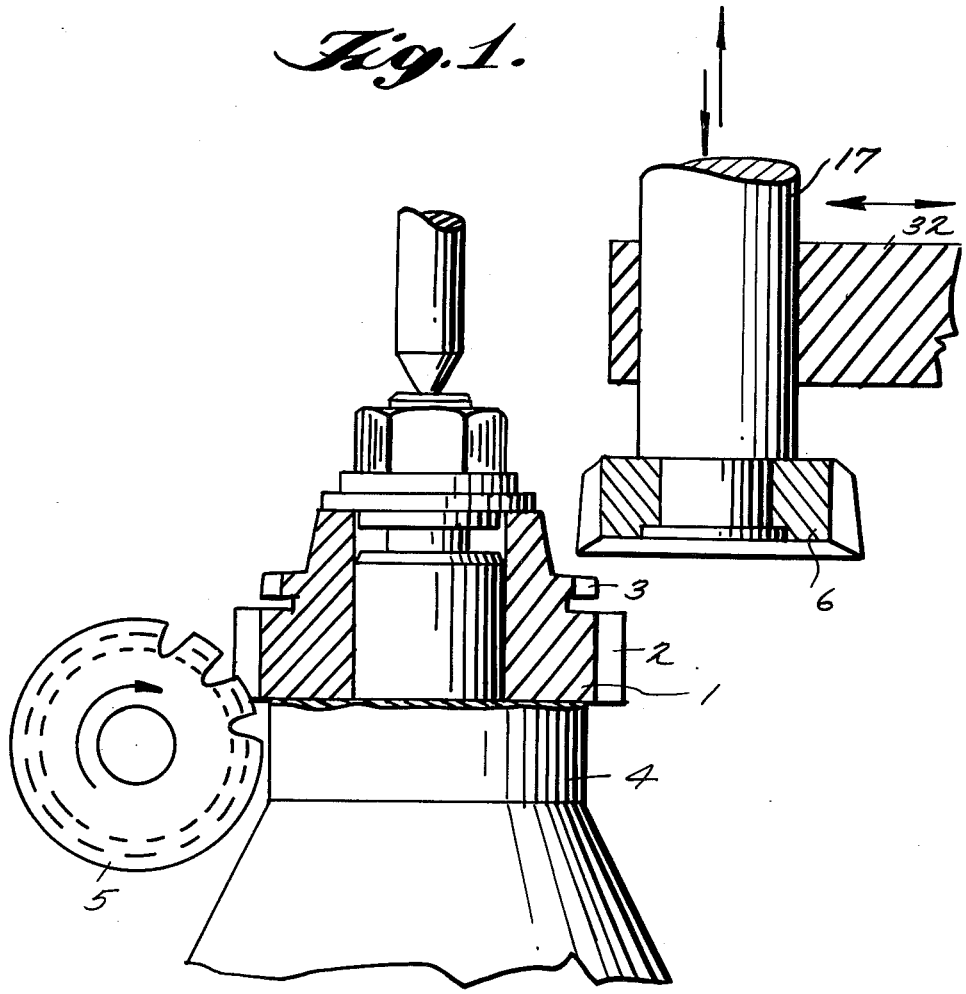
FIGURE 1 is a view, partly in section, showing a wheel body workpiece operatively mounted in my novel apparatus for the simultaneous forming of a transmission gear by hobbing and a clutch gear by a gear shaper cutter.

Generally, my novel apparatus comprises a single workpiece table operatively associated with two different gear machining arrangements, each machining arrangement being adapted to perform a different gear generating process. One of the gear machining arrangements comprises a hobbing apparatus since hobbing, as aforementioned, is the most economical process of gear cutting. The other machining arrangement comprises a gear shaper apparatus since in the gear shaper process, as well as in the hobbing process, the tool and workpiece carry out a uniform rotation. It is because of the uniform rotation of the tool and the workpiece in the hobbing process that a gear shaper apparatus, rather than a gear planing apparatus, is combined with the hobbing apparatus.

While gear cutting machines with two-position machining facilities for one workpiece are known in the art, they have been limited to the use of two identical tools which perform the same generating process, namely, either hobbing or gear shaping and have not employed the novel combination of two different tools which perform two different gear generating processes such as hobbing and shaping simultaneously on a single workpiece. Such two-position prior art apparatus have included the so-called two-column machines for hobbing gears having the same diameter and pitch as are found on large double helical ship transmissions. Similarly, machines for smaller gear wheels wherein two hob slides run on separate tracks on one column whereby the two hobs can work simultaneously or consecutively on a single workpiece are known to the prior art. Furthermore, it is known to utilize an apparatus employing two gear shaping arrangements for the cutting of a toothed rim. In such apparatus, the slides of the two gear shaper cutting units are displaced from one another at the smallest possible angle about the workpiece center since the first shaper cutter only rough cuts the tooth rim while the second shaper cutter follows the roughing cutter as closely as possible so as to finish cutting the tooth rim.

Since in the hobbing process and in the gear shaping process, quite different operations take place, it is necessary that one of the processes be adjusted so as to accommodate the other in order to simultaneously hob and gear shape two gears on a single workpiece. In this regard, it is preferred to adjust the gear shaping operation so as to accommodate the hobbing operation rather than adjust the hobbing operation to suit the gear shaping operation. Thus, the rotational speed of the workpiece will be determined by the speed at which it can be hobbed.

In the gear shaping process, up until the present time, only small rotary feeds have been applied in the circumferential direction of the workpiece. Thus, after the short radial approach of the shaper cutter, the full depth of the tooth space is worked out either all at once or in steps during only two or three revolutions of the workpiece. In the apparatus of the instant invention wherein the machine combines the hobbing and gear shaping processes, the workpiece, because of the hobbing process, must revolve considerably more rapidly about its axis than in the usual gear shaping process, so that a considerably high rotary feed results. There is a limiting permissible rotary feed of the shaper cutter which must be considered, since the number of strokes per minute of the shaper cutter is limited by the highest permissible cutting speed of the shaper cutter. However, in my novel apparatus, due to the requirements of the hobbing operation, there are many more revolutions of the workpiece available for the gear shaping operation than in a conventional gear shaping operation, thereby permitting a corresponding reduction in the depth of cut per stroke of the shaper cutter. The rate of revolution of the workpiece will be particularly great if the hob approach to the workpiece is relatively long and by the axial feed. In such instances, if the second gear-tooth system which is to be produced by gear shaping is narrow, as for example a clutch gearing, requiring only short shaper cutter strokes, the rate of shaper cutter strokes can be quite high.

In order to ensure that the tooth depth of the shaper generated gear-tooth system is uniform, it is important, after the shaper cutter has reached full working depth, that one or more revolutions of the workpiece take place while continuing the gear generating operation of the shaper cutter.

My novel apparatus, described in detail hereinbelow by reference to FIGURES 1–3 of the drawings not only operatively combines a gear hobbing apparatus and gear shaper apparatus on a single machine for simultaneous operation on a single blank to produce two different gear-tooth systems, but also coordinates the two processes so as to accomplish the foregoing requirements.

Referring now to FIGURE 1 of the drawings, there is shown a workpiece 1 operatively carried by the rotatable chuck 4 of my novel combined hobbing and gear shaping machine. The hobbing and gear shaping machine includes a suitable hob 5 and gear shaper cutter 6, operatively associated with the chuck 4 so as to simultaneously form a transmission gear 2 and clutch gear 3, respectively, on the workpiece 1. The clutch gear 3, which is generated by the shaper cutter 6, will be seen to be smaller in diameter than the transmission gear 2 formed by the hob and closely spaced thereto. The shaper cutter is operatively carried by a rotatable and reciprocable cutter spindle 17 for rotation and reciprocation therewith. The cutter spindle 17 is operatively engaged by a spindle guide 32 adapted to move with the spindle 17 radially of the workpiece, as shown by the double arrow.

Figure 3:
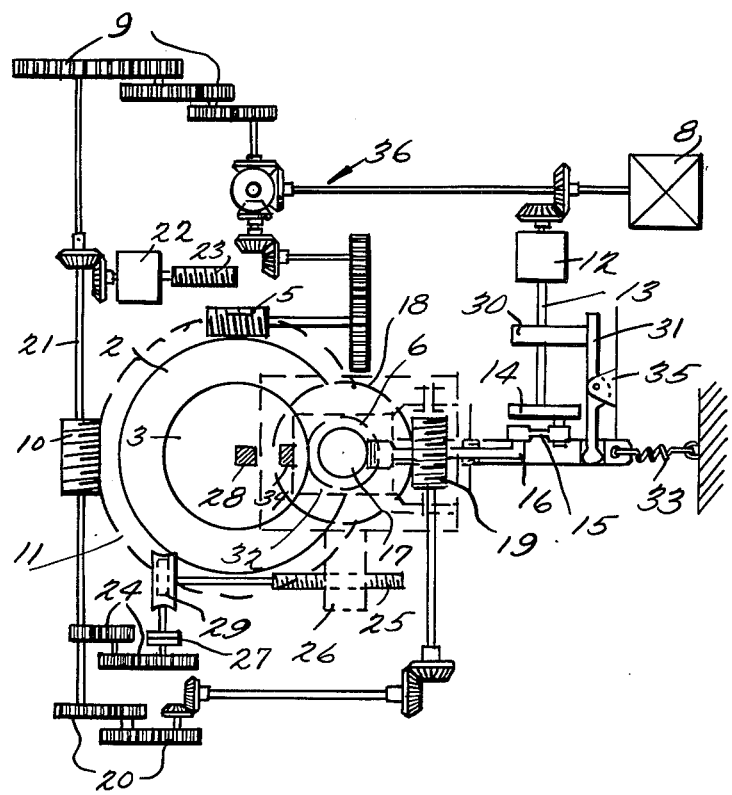
FIGURE 3 is a diagrammatic plan view showing the gear transmission of my novel apparatus.

Reference is now made to FIGURE 3 of the drawings wherein the gear transmission arrangement for transmitting power to the various elements of the apparatus from a single power source such as motor 8 is shown. The main motor 8 drives the hob 5 through a suitable gear and shaft rotative power transmitting linkage 36. At the same time, the motor 8 through another suitable rotative power transmitting linkage, including indexing change gears 9 and indexing worm shaft 21, rotates the master worm 10 to thereby drive the master worm wheel 11 of the workpiece table 37 which carries the chuck 4. In addition, the main motor 8 is connected to the shaper cutter spindle 17 carrying the shaper cutter 6 so as to effect reciprocation of the same, through a suitable transmission gear 12, shaft 13, eccentric means or crank 14, connecting rod 15 and link 16. The cutter spindle 17 is rotationally fixed to the indexing worm wheel 18 that receives its indexing drive through the indexing worm 19. If helical gears are to be cut, spiral motion can be imparted to the cutter spindle 17 by means of a suitable helical guide (not shown) in a known manner. The indexing worm 19 is geared to the worm 10, which drives the master worm wheel 11, through suitable shaft means and change gears 20. In addition, the indexing worm shaft 21 drives, through the feed transmission gear 22, the feed spindle 23, which imparts the desired axial feed to the hob slide 39 and the hob 5. Furthermore, the cutter spindle saddle 26, which is situated on the workpiece slide 38 and which operatively mounts the cutter spindle 17 carrying the shaper cutter 6, is operatively connected to the indexing worm shaft 21 through feed transmission gears 24 and a feed spindle 25, so that radial feed of the shaper cutter 6 will be effected by radial feeding movement of the cutter saddle 26. It will thus be clear that the radial feeding movement of the gear shaper cutter 6 will be coordinated with and determined by the rotational movement of the master worm 10 which drives the master worm wheel 11 of the workpiece table. The power transmitting linkage connecting the spindle saddle 26 to the indexing worm shaft 21 includes a release coupling 27 which, in cooperation with an adjustable dog and limit switch (now shown), permits the radial feed of the cutter spindle saddle 26 to be stopped, in a well-known manner, when the shaper cutter has reached the root of the gear 3. Alternatively, the cutter spindle saddle 26 may also be advanced so as to abut against an adjustable dead stopping means 28 by employing a worm wheel drive 29 (shown in dotted lines in FIGURE 3) with a disengaging worm mechanism (not shown) to interrupt the drive. Similarly, in the event hydraulic feed (not shown) is employed, a means to actuate a valve which will interrupt the flow of fluid may be used.

Shaft 13 carries a cam 30 which actuates a double lever 31 to swivel or pivot the cutter spindle guide 32 about the pivot 35 (see FIGURE 3) or the axis of the worm 19 (see FIGURE 2) toward the workpiece 1 to thereby place and maintain the shaper cutter 6 in cutting position during its cutting stroke. During the cutting stroke of the gear shaper cutter 6, the cam 30 and dog 34 retain the cutter spindle guide 32 in its cutting position. On the return stroke of the gear shaper cutter 6, the cutter spindle guide 32 is pivoted about the axis of the worm 19 away from the workpiece 1 by a spring 33 to thereby impart relieving movement to the shaper cutter 6 and withdraw the same from the workpiece.

Figure 2:
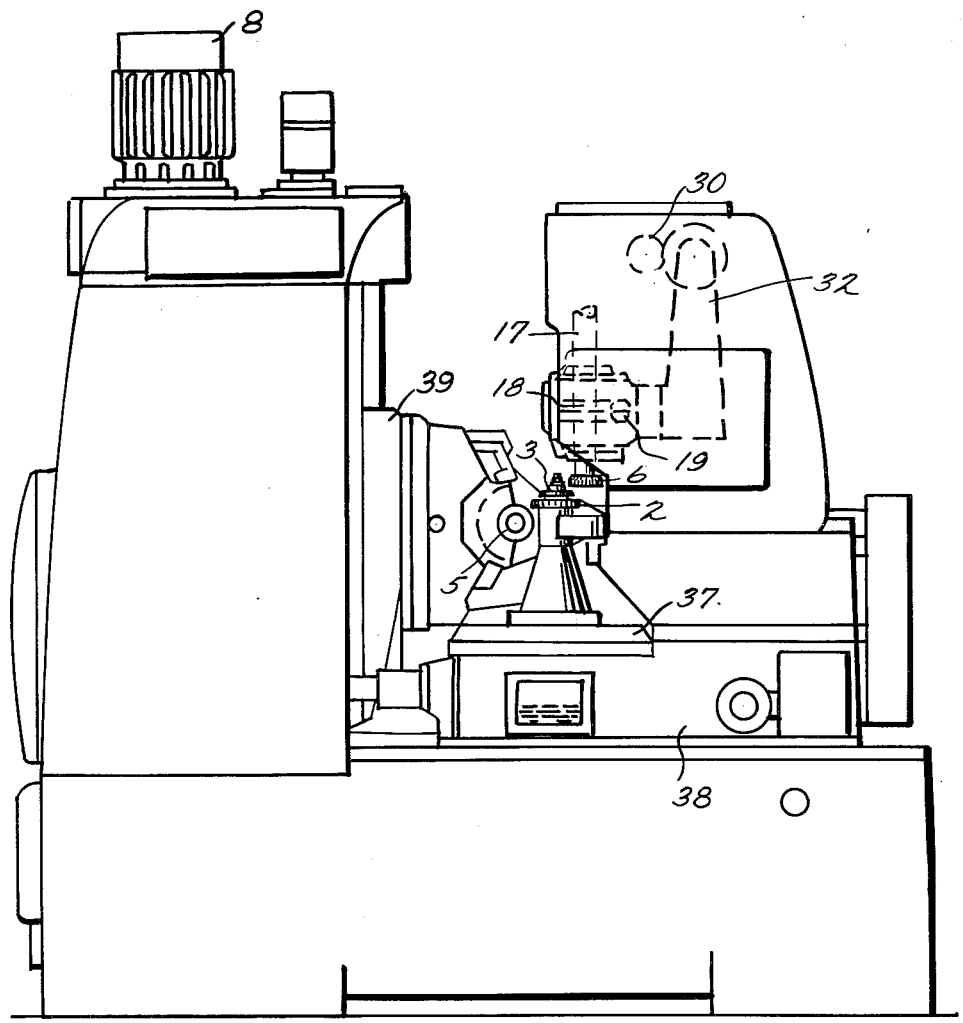
FIGURE 2 is a front view of my novel combined hobbing and gear shaping machine.

Referring now to FIGURE 2, there is shown a combined hobbing and gear shaping machine according to the present invention which differs from the embodiment just described in that the cutter spindle guide 32 is actuated directly by the cam 30, thereby eliminating the double lever 31 previously described.

In the event that a helical transmission gear 2 is to be formed by hobbing, the apparatus of the instant invention may, of course, be equipped in a well-known manner with the Pfauter differential gear and differential change gears. In addition, it will be apparent that the hobbing unit and the gear shaper unit may be operated independently and that the various gear-tooth systems to be formed, such as the transmission gear 2 and the clutch gear 3, may be formed successively, rather than simultaneously.

Thus, it will be seen that by virtue of the aforedescribed gear transmission arrangement, the working movements of the hob, shaper cutter and workpiece are controlled and coordinated in a predetermined manner so as to not only permit the simultaneous hobbing and gear shaping of a single workpiece but also permit the desired control of the finish formed by the hobbing and shaping operations.

It will thus be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. An apparatus for simultaneously forming two different gears on a single workpiece comprising in combination: a rotatable workpiece mounting means; a hobbing means including a hob operatively associated with said workpiece mounting means so as to hob the first of two gears on a workpiece operatively mounted by said workpiece mounting means and a gear shaper means including a rotatable gear shaper cutter also operatively associated with said workpiece mounting means and means to relatively rotate said gear shaper cutter with respect to said rotatable workpiece mounting means so as to generate the second of said two gears on the workpiece while said hob is hobbing said first gear.

2. The apparatus defined in claim 1 wherein the hobbing means and the gear shaper means are carried by separate portions of the apparatus so as to be adjustable independently of each other.

3. The apparatus defined in claim 1 wherein the gear shaper means includes a cutter spindle saddle carried by a workpiece slide.

4. The apparatus defined in claim 1 wherein a single motor means actuates the hobbing means and the gear shaper cutter means and also effects rotation of the workpiece.

5. The apparatus defined in claim 2 wherein a single motor means actuates the hobbing means and the gear shaper cutter means and also effects rotation of the workpiece.

6. The apparatus defined in claim 3 wherein a single motor means actuates the hobbing means and the gear shaper cutter means and also effects rotation of the workpiece.

7. The apparatus defined in claim 1 wherein the hobbing means and the gear shaper means are driven independently and the drive of each of said means is adjustable so as to provide various working speeds.

8. The apparatus defined in claim 2 wherein the hobbing means and the gear shaper means are driven independently and the drive of each of said means is adjustable so as to provide various working speeds.

9. The apparatus defined in claim 3 wherein the hobbing means and the gear shaper means are driven independently and the drive of each of said means is adjustable so as to provide various working speeds.

10. The apparatus defined in claim 1 wherein the workpiece mounting means is rotated by a master worm and worm gear and the rotating drive of the gear shaper cutter is connected to said master worm.

11. The apparatus defined in claim 4 wherein the workpiece mounting means is rotated by a master worm and worm gear and the rotating drive of the gear shaper cutter is connected to said master worm.

12. The apparatus defined in claim 1 which includes an indexing worm and worm gear for indexing the gear shaper cutter and means to pivot the gear shaper cutter about the axis of said indexing worm away from the workpiece after the gear shaper cutter has completed a cutting stroke.

13. An apparatus for simultaneously generating two closely spaced gears of different diameter on a single wheel body comprising in combination: a base, a rotatable chuck means carried by said base and adapted to operatively carry a wheel body; a gear hobbing means carried by said base and including a rotatable hob, said hob being adjacent one side of said chuck means so as to operatively engage said wheel body carried thereby and generate the larger diameter gear by hobbing; a gear shaper means carried by said base and including a rotatable, reciprocable gear shaper cutter, said gear shaper cutter being adjacent another side of said chuck means so as to operatively engage said wheel body and generate the smaller diameter gear on said wheel body; motor means and power transmitting means connecting said motor means to said rotatable chuck means, said gear hobbing means and said gear shaper means whereby said hob will generate said larger diameter gear while said gear shaper will simultaneously generate said smaller gear on said wheel body.

14. The apparatus defined in claim 13 wherein the means connecting the motor means to the gear hobbing means and the gear shaper means is adjustable so as to provide various working speeds.

15. The apparatus defined in claim 5 wherein the workpiece mounting means is rotated by a master worm and worm gear and the rotating drive of the gear shaper cutter is connected to said master worm.

16. The apparatus defined in claim 10 wherein the radial feed drive of the gear shaper cutter is connected to the master worm so that the radial feeding movement of the gear shaper cutter is derived from the rotation of the master worm.

17. The apparatus defined in claim 15 wherein the radial feed drive of the gear shaper cutter is connected to the master worm so that the radial feeding movement of the gear shaper cutter is derived from the rotation of the master worm.

18. The apparatus defined in claim 1 wherein the gear shaper cutter is carried by a cutter spindle and an adjustable spindle guide means operatively engages said spindle so as to maintain the shaper cutter in a desired cutting position during its cutting stroke.

19. The apparatus defined in claim 10 wherein the gear shaper cutter is carried by a cutter spindle and an adjustable spindle guide means operatively engages said spindle so as to maintain the shaper cutter in a desired cutting position during its cutting stroke.

References Cited by the Examiner
UNITED STATES PATENTS

| | | | |
|---|---|---|---|
| 1,267,970 | 5/18 | Burgess | 90—4 |
| 2,451,447 | 10/48 | Ransome | 90—4 |
| 2,464,961 | 3/49 | Bean | 90—7 |
| 3,021,765 | 2/62 | Cobb | 90—7 |

WILLIAM W. DYER, JR., *Primary Examiner.*